United States Patent
Miyamoto (10) Patent No.: US 8,427,462 B2
(45) Date of Patent: Apr. 23, 2013

(54) LIQUID CRYSTAL DISPLAY APPARATUS AND LIQUID CRYSTAL DISPLAY APPARATUS CONTROL METHOD

(75) Inventor: Tsuneo Miyamoto, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 732 days.

(21) Appl. No.: 12/312,187

(22) PCT Filed: Nov. 6, 2007

(86) PCT No.: PCT/JP2007/071562
§ 371 (c)(1),
(2), (4) Date: Sep. 14, 2009

(87) PCT Pub. No.: WO2008/056669
PCT Pub. Date: May 15, 2008

(65) Prior Publication Data
US 2010/0053132 A1  Mar. 4, 2010

(30) Foreign Application Priority Data
Nov. 7, 2006 (JP) ................. 2006-302051

(51) Int. Cl.
*G09G 5/00* (2006.01)
(52) U.S. Cl.
USPC ............... 345/207; 345/87; 345/102
(58) Field of Classification Search ............ 345/22, 345/39, 48, 50, 82–84, 87–88, 204, 207–208, 345/214, 699
See application file for complete search history.

(56) References Cited

U.S. PATENT DOCUMENTS

| | | | | |
|---|---|---|---|---|
| 4,825,201 A | * | 4/1989 | Watanabe et al. | 345/2.1 |
| 5,359,345 A | * | 10/1994 | Hunter | 345/102 |
| 6,188,380 B1 | | 2/2001 | Kawashima et al. | |
| 7,064,740 B2 | * | 6/2006 | Daly | 345/102 |
| 7,370,979 B2 | * | 5/2008 | Whitehead et al. | 353/85 |
| 7,777,945 B2 | * | 8/2010 | Whitehead et al. | 359/443 |

(Continued)

FOREIGN PATENT DOCUMENTS

| | | |
|---|---|---|
| EP | 1 675 097 A2 | 6/2006 |
| JP | 63-261327 | 10/1988 |

(Continued)

OTHER PUBLICATIONS

Notice of Reasons for Rejection dated Sep. 7, 2010, with English translation.

(Continued)

*Primary Examiner* — William Boddie
*Assistant Examiner* — Mansour M Said
(74) *Attorney, Agent, or Firm* — McGinn IP Law Group, PLLC (57) ABSTRACT

A liquid crystal display apparatus according to the present invention includes: a liquid crystal panel; a backlight provided on a rear face of the liquid crystal panel; a detector which detects RGB output light levels of the backlight; a first controller which controls backlight current for driving the backlight so that a prescribed luminance is attained based on the RGB output light levels detected by the detector; and a second controller which controls display signals supplied to the liquid crystal panel so that a prescribed chromaticity is attained based on the RGB output light levels detected by the detector.

3 Claims, 6 Drawing Sheets

U.S. PATENT DOCUMENTS

| | | | |
|---|---|---|---|
| 7,800,822 B2 * | 9/2010 | Whitehead et al. | 359/443 |
| 7,830,358 B2 * | 11/2010 | Seetzen | 345/102 |
| 7,872,659 B2 * | 1/2011 | Seetzen | 345/690 |
| 2002/0070914 A1 * | 6/2002 | Bruning et al. | 345/102 |
| 2005/0162737 A1 * | 7/2005 | Whitehead et al. | 359/454 |
| 2005/0184952 A1 | 8/2005 | Konno et al. | |
| 2006/0097978 A1 | 5/2006 | Ng et al. | |
| 2007/0091055 A1 * | 4/2007 | Sakuda | 345/102 |
| 2008/0180465 A1 * | 7/2008 | Whitehead et al. | 345/694 |

FOREIGN PATENT DOCUMENTS

| | | |
|---|---|---|
| JP | 10-222084 | 8/1998 |
| JP | 2000-315594 | 11/2000 |
| JP | 2006-091235 | 4/2006 |
| JP | 2006-133764 | 5/2006 |
| WO | WO 2005/050613 A1 | 6/2005 |

OTHER PUBLICATIONS

European Search Report dated Nov. 18, 2010.

* cited by examiner

SPECTRUM OF SENSORS

FIG. 2B

TRISTIMULUS VALUES

→ COMPARISON OF SENSOR VALUE Lv=Y AND EXPECTED VALUE Lv' → BACKLIGHT CONTROL

BEFORE LUMINANCE UNIFORMITY CORRECTION

FIG. 9B

AFTER LUMINANCE UNIFORMITY CORRECTION

LIQUID CRYSTAL DISPLAY APPARATUS AND LIQUID CRYSTAL DISPLAY APPARATUS CONTROL METHOD

TECHNICAL FIELD

The present invention pertains to a liquid crystal display apparatus having a backlight, and relates to a liquid crystal display device with controllable luminance and color, and a control method for a liquid crystal display apparatus.

Priority is claimed on Japanese Patent Application No. 2006-302051 filed Nov. 7, 2006, the content of which is incorporated herein by reference.

BACKGROUND ART

Conventionally, for purposes of controlling the backlight of a liquid crystal display apparatus, there is a technology of controlling the lamp current of the backlight according to output information of luminance sensors pertaining to light leaked from a reflecting plate of the backlight (see, e.g., Patent document 1). In the conventional art, light leaked from the reflecting plate of a liquid crystal module is detected by sensors, and luminance control signals are outputted while monitoring this detected output so that the luminance set by the user is attained, thereby enabling maintenance of optimal display conditions.

In addition, there is a technology in which a liquid crystal panel is controlled using a look-up table in accordance with output information of color sensors pertaining to the chromaticity of the backlight, so that ΔEa*b* is minimized (see, e.g., Patent document 2). In the conventional technology, the chromaticity of the illuminating light of the liquid crystal module is detected by sensors, and display signals of the liquid crystal panel are controlled so that color differences relative to preset chromaticity information are minimized.

[Patent document 1] Japanese Patent Publication No. 3171808 (Page 3, FIG. 1)
[Patent document 2] Japanese Unexamined Patent Application, First Publication No. 2006-91235 (Page 14, FIG. 4)

DISCLOSURE OF THE INVENTION

Problem to be Solved by the Invention

Incidentally, with respect to a liquid crystal display apparatus using a CCFL (cold cathode fluorescent lamp) in the backlight, it is known that deterioration in the luminous efficiency of blue fluorescent material over time is quicker than that of red and green fluorescent material. That is, the white points of the liquid crystal display apparatus assume a yellowish tint as time passes. In terms of fields of application of liquid crystal display apparatuses, temporal variation in color is particularly problematic in the medical field which compares past diagnostic images and current diagnostic photographs, and in the graphics design field which requires concordance of actual colors and display colors.

In the above-described prior art (Patent document 1), the brightness of the backlight is fixed by detecting the intensity of the light of the backlight with luminance sensors, and controlling the current of the backlight. There is the problem that this is for control of luminance alone, and does not further enable adjustment of chromaticity.

Moreover, in the above-described prior art (Patent document 2), variable display signals are supplied to the liquid crystal panel based on chromaticity information outputted from color sensors that measure the chromaticity of illuminating light supplied from the backlight. However, the prior technology uses a method that obtains color differences ΔEa*b*, and conducts control according to a look-up table, and there is the problem that it is not possible to simultaneously control chromaticity and luminance without impairing the gradation properties of the signals.

The present invention has conceived in light of these circumstances, and its object is to offer a liquid crystal display apparatus and a control method for a liquid crystal display apparatus which enable achievement of constant and stable luminance and chromaticity.

Means for Solving the Problem

In order to solve the above-described problems, a liquid crystal display apparatus according to the present invention includes: a liquid crystal panel; a backlight provided on a rear face of the liquid crystal panel; a detector which detects RGB output light levels of the backlight; a first controller which controls backlight current for driving the backlight so that a prescribed luminance is attained based on the RGB output light levels detected by the detector; and a second controller which controls display signals supplied to the liquid crystal panel so that a prescribed chromaticity is attained based on the RGB output light levels detected by the detector.

The liquid crystal display apparatus according to the present invention may include: a first converter which converts the RGB output light levels detected by the detector into tristimulus values; and a second converter which converts the tristimulus values into a luminance value and chromaticity values, the first controller may control the backlight current for driving the backlight based on the luminance value converted by the second converter, and the second controller may control the display signals supplied to the liquid crystal panel based on the chromaticity values converted by the second converter.

In the liquid crystal display apparatus according to the present invention, the first controller may control the backlight current so that the luminance value converted by the second converter matches a prescribed expected value.

In the liquid crystal display apparatus according to the present invention, the second controller may control the display signals supplied to the liquid crystal panel so that the chromaticity values converted by the second converter match prescribed expected values or initial values.

The liquid crystal display apparatus according to the present invention may include a corrector which corrects the prescribed expected value when the first controller controls the backlight current for driving the backlight, in order to prevent luminance variation in the liquid crystal panel produced when the second controller controls the display signals supplied to the liquid crystal panel.

In order to solve the above-described problems, a liquid crystal display control method according to the present invention is for a liquid crystal display apparatus including a liquid crystal panel and a backlight provided on a rear face of the liquid crystal panel, and includes the steps of: detecting a RGB output light levels of the backlight; controlling backlight current for driving the backlight so that a prescribed luminance is attained based on the detected RGB output light levels; and controlling display signals supplied to the liquid crystal panel so that a prescribed chromaticity is attained based on the detected RGB output light levels.

Effects of the Invention

According to the present invention, RGB output light levels of the backlight are detected by a detector, backlight current for driving the backlight is controlled by a first controller so that a prescribed luminance is attained based on the RGB output light levels, and display signals supplied to the liquid crystal panel are controlled by a second controller so that a prescribed chromaticity is attained based on the RGB output light levels. Consequently, it is possible to achieve constant and stable luminance and chromaticity. With respect to the place of measurement, light that leaks from a reflecting plate on the back face may be measured, or light that is guided by an optical guide plate may be measured.

According to an embodiment of the present invention, the detected RGB output light levels are converted into tristimulus values by a first converter, the tristimulus values are converted into a luminance value and chromaticity values by a second converter, the backlight current for driving the backlight is controlled based on the luminance values, and display signals supplied to the liquid crystal panel are controlled based on the chromaticity values. Consequently, it is possible to obtain accurate tristimulus values from the RGB output light levels of the backlight, and achieve a more constant and stable luminance and chromaticity.

According to an embodiment of the present invention, the backlight current is controlled by a first controller so that the luminance value converted by the second converter match a prescribed expected value. Consequently, it is possible to obtain a desired luminance that is preset at a stage prior to factory shipment.

According to an embodiment of the present invention, display signals supplied to the liquid crystal panel are controlled by a second controller so that chromaticity values converted by the second converter match prescribed expected values or initial values. Consequently, it is possible to obtain a desired chromaticity that is preset at the stage prior to factory shipment.

According to an embodiment of the present invention, in order to prevent luminance variation in the liquid crystal panel produced when the second controller controls display signals that are supplied to the liquid crystal panel, a prescribed expected value is corrected by a corrector when the first controller controls backlight current for driving the backlight. Consequently, it is possible to prevent luminance variation in the liquid crystal panel arising due to chromaticity control.

REFERENCE SYMBOLS 1 liquid crystal panel
2 backlight
3 cold cathode fluorescent lamp
4 inverter circuit (first controller)
5, 6, and 7 sensor (detector)
8 current voltage converter
9 A/D converter
10 CPU (first controller, second controller, first converter, second converter, corrector)
11 signal processor (second controller)

BEST MODE FOR CARRYING OUT THE INVENTION

Below, the liquid crystal display apparatus according to one embodiment of the present invention is described with reference to drawings.

Figure 1:
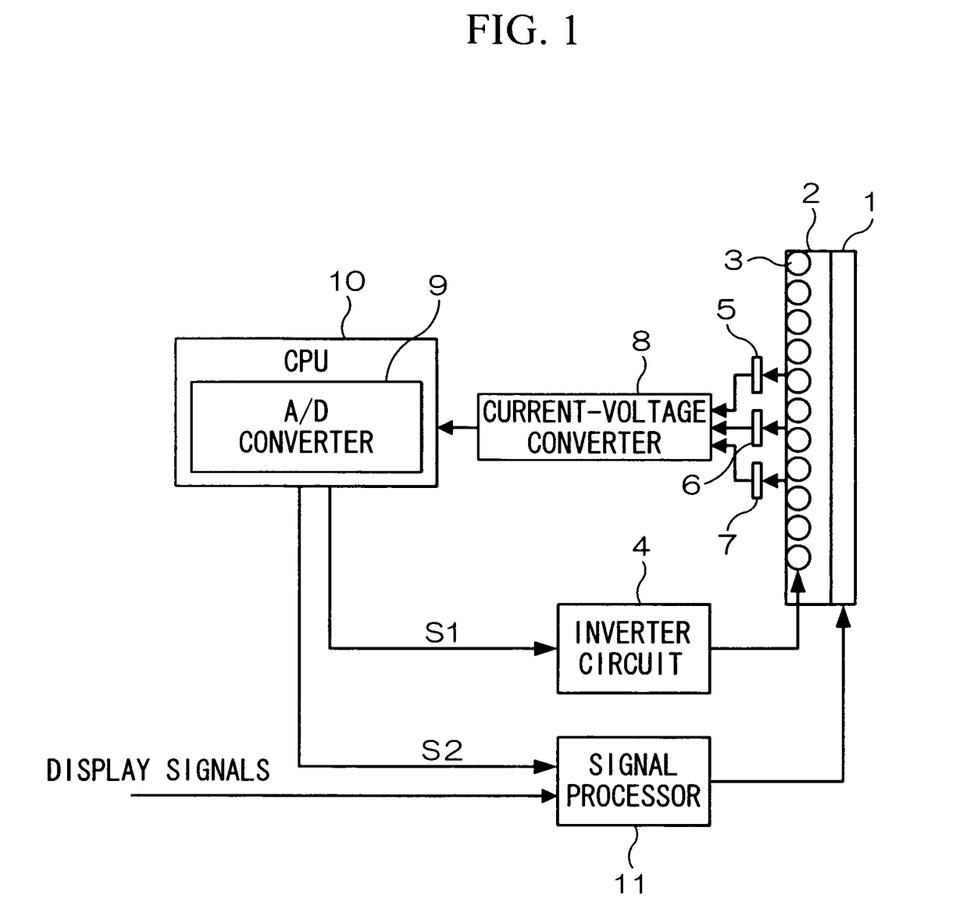
FIG. 1 is a block diagram which shows the configuration of a liquid crystal display apparatus according to an embodiment of the present invention.

FIG. 1 is a block diagram which shows the configuration of a liquid crystal display apparatus of an embodiment of the present invention. In FIG. 1, 1 is a liquid crystal panel, which has a color filter divided into RGB, and which displays the respective gradations of RGB by controlling signal levels corresponding to RGB. 2 is a backlight system (hereinafter, simply "backlight"), which converts the gradations of the liquid crystal panel 1 into luminance. The backlight 2 includes a plurality of cold cathode fluorescent lamps (CCFL) 3, and an inverter circuit 4 which controls the current thereof. The luminance of the liquid crystal panel 1 is increased or decreased by controlling the current of the plurality of cold cathode fluorescent lamps 3.

The sensors 5, 6, and 7 detect the light (R, G, B) that leaks or that is guided and extracted from the backlight 2, convert it into current corresponding to the respective light quantity, and supply this to the current-voltage converter 8. The current-voltage converter 8 converts the current from the sensors 5, 6, and 7 into voltage, and supplies it to the CPU 10. The CPU 10 has an A/D converter 9, which converts the voltage from the aforementioned current-voltage converter 8 into digital data (hereinafter, RGB data).

After CPU 10 conducts prescribed arithmetic computation relative to RGB data converted by the A/D converter 9—that is, RGB data corresponding to the light quantity of the light (R, G, B) that leaks or that is guided and extracted from the backlight 2—it generates control signals S1, S2 for controlling the current of the backlight 2 and for controlling the signal levels of the liquid crystal panel according to the results of the arithmetic computation to supply them to the inverter circuit 4 and signal processor 11 respectively. The inverter circuit 4 controls the current of the backlight 2 according to the aforementioned control signal S1. The signal processor 11 controls the signal levels of the liquid crystal panel 1 according to the aforementioned control signal S2.

According to the above-described configuration, after conversion of the light that leaks or is guided and extracted from the backlight 2 into current by the three RGB sensors 5, 6, and 7, the current is converted into voltage by the current-voltage converter 8, and the voltage is converted into RGB data by the A/D converter 9. In the CPU 10, prescribed arithmetic computation is conducted relative to the digitalized RGB data, and control signals S1 and S2 for controlling the current of the backlight 2 and for controlling the signal levels of the liquid crystal panel 1 are generated. Control signal S1 is a control signal based on the luminance of the backlight 2 detected by the sensors 5, 6, and 7. Control signal S2 is a control signal based on the color temperatures of the backlight 2 detected by the sensors 5, 6, and 7. In the inverter circuit 4, the current of the backlight 2 is controlled according to the aforementioned control signals S1. In the signal processor 11, the signal levels of the liquid crystal panel 1 is controlled according to the aforementioned control signals S2.

Next, the arithmetic processing of the aforementioned CPU 10 is described.

Figure 2A:
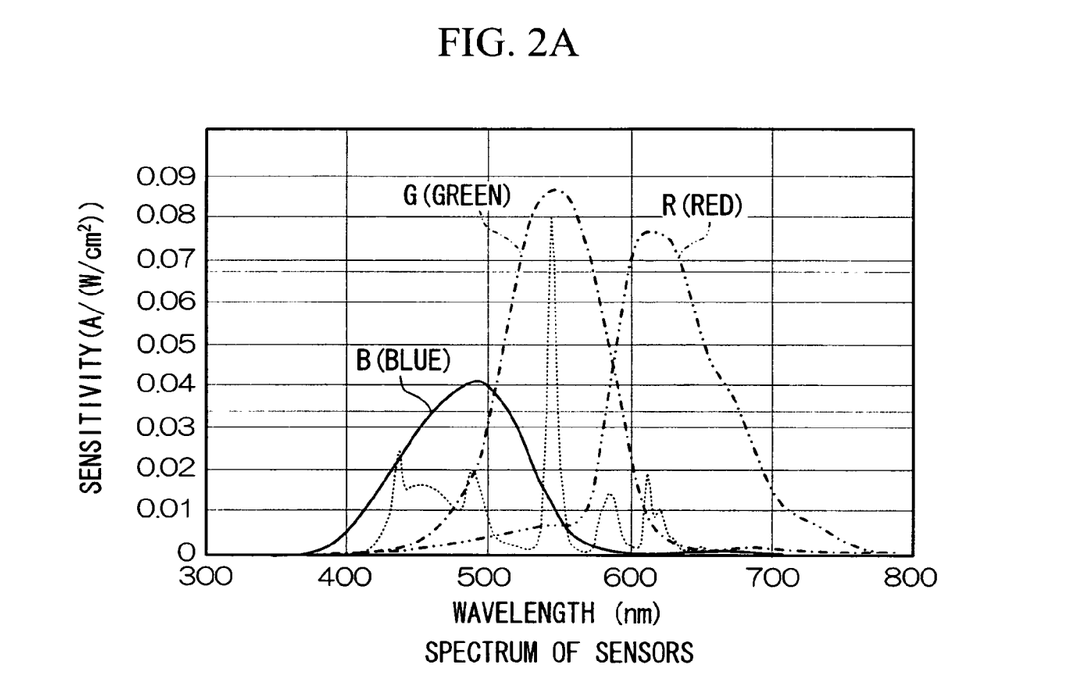
FIG. 2A is a schematic view which shows the chromaticity spectral properties of sensors 5, 6, and 7, and the spectral properties of tristimulus values XYZ in the present embodiment.
Figure 2B:
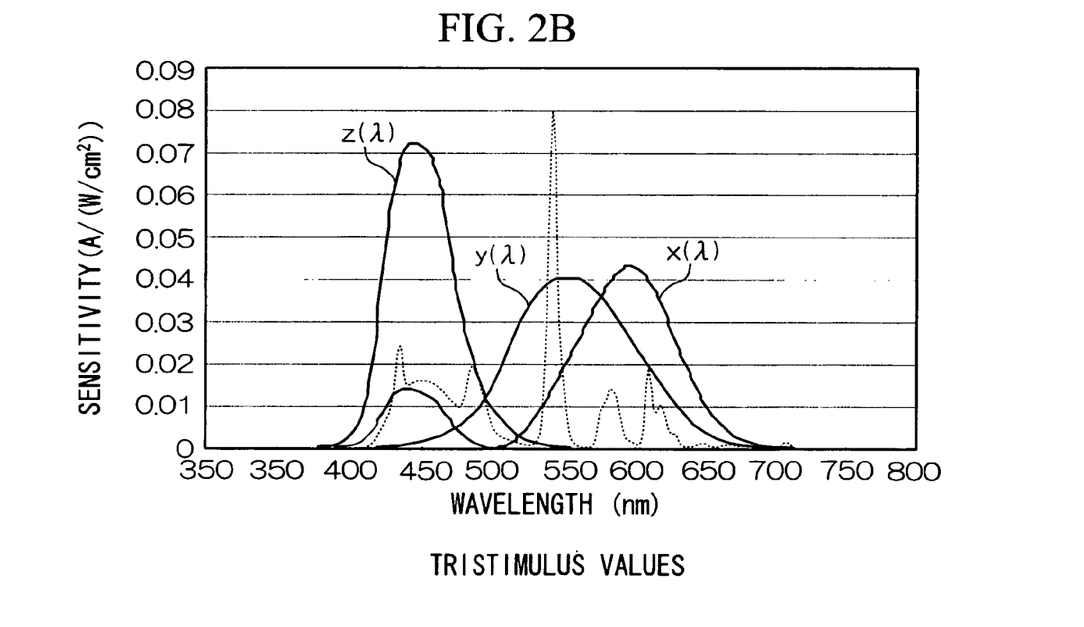
FIG. 2B is a schematic view which shows the chromaticity spectral properties of the sensors 5, 6, and 7, and the spectral properties of tristimulus values XYZ in the present embodiment.

The CPU 10 converts the digitalized RGB data into tristimulus signals XYZ which measure the surface of the liquid crystal panel 1. This is because, as shown by FIG. 2A and FIG. 2B, the chromaticity spectral properties of the respective sensors 5, 6, and 7 of RGB do not completely match the spectral properties of the tristimulus values X, Y, and Z. The CPU 10 converts the RGB data into the tristimulus values X, Y, and Z according to the below formulae (1), (2), and (3).

[Formula 1]

$$X=aRs+bGs+cBs+d \quad (1)$$

[Formula 2]

$$Y=eRs+fGs+gBs+h \quad (2)$$

[Formula 3]

$$Z=iRs+jGs+kBs+l \quad (3)$$

In the above formulae (1), (2), and (3), Rs, Gs, and Bs are output values of the sensors 5, 6, and 7; a, b, c, d, e, f, g, h, i, j, k, and l are fixed constants proper to each model; and X, Y, and Z are tristimulus values.

With respect to all models, if it is assumed that the ratios of Rs, Gs, and Bs in the respective tristimulus values are equal, the above formulae (1), (2), and (3) would be expressed by the below formulae (4), (5), and (6).

[Formula 4]

$$X=a(Rs+b'Gs+c'Bs)+d \quad (4)$$

[Formula 5]

$$Y=e(Rs+f'Gs+g'Bs)+h \quad (5)$$

[Formula 6]

$$Z=i(Rs+j'Gs+k'Bs)+l \quad (6)$$

In the above formulae (4)-(6), b', c', f', g', j', and k' are fixed constants common to all models.

Figure 3:
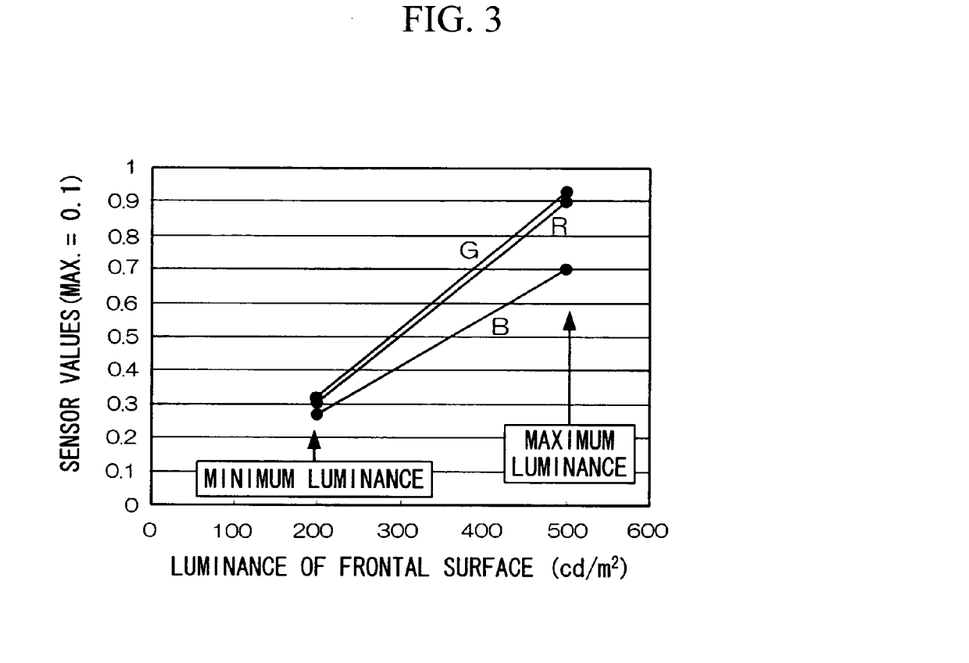
FIG. 3 is a schematic view which shows irregularity in the sensitivities of the sensors 5, 6, and 7.

For each model, the variables a, d, e, h, i, and l of formulae (4), (5), and (6) are found by obtaining the measurement values of the tristimulus values X, Y, and Z of the liquid crystal panel surface at the maximum luminance and minimum luminance of a prescribed luminance range, and the sensor values Rs, Gs, and Bs at that time. By this means, it is possible to calibrate irregularities in the sensitivities of the sensors 5, 6, and 7 like those shown in FIG. 3, and also to adopt tracking in their luminance ranges.

As stated above, the sensor values Rs, Gs, and Bs, which are obtained by detecting the three-wavelength optical output of the backlight 2 with the respective sensors 5, 6, and 7 of RGB, is correlated with the tristimulus values X, Y, and Z of the liquid crystal surface. From these tristimulus values X, Y, and Z, it is also possible to obtain a luminance value Lv and chromaticity values x, y in accordance with the below formulae (7), (8), and (9).

[Formula 7]

$$Lv=Y \quad (7)$$

[Formula 8]

$$x=X/(X+Y+Z) \quad (8)$$

[Formula 9]

$$y=Y/(X+Y+Z) \quad (9)$$

Figure 4:
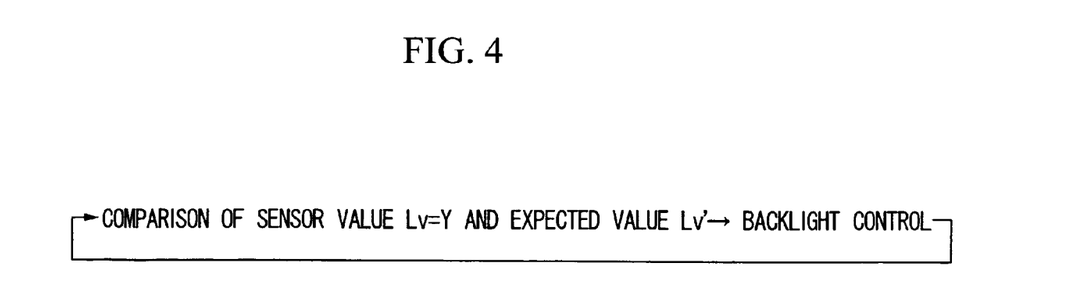
FIG. 4 is a schematic view which serves to describe a control method according to the present embodiment.

As stated above, if sensor values Rs, Gs, and Bs are known, the tristimulus values X, Y, and Z of the liquid crystal surface are found in a certain luminance range. Consequently, it is possible to conduct control so that the luminance value Lv is the expected value Lv' by controlling the backlight current. That is, a loop like that shown in FIG. 4 is configured.

With respect to chromaticity, as it is difficult to cause variation in the color temperature of the backlight 2, the chromaticity of the liquid crystal panel 1 is fixed by having the signal processor 11 cause variation in the levels of the display signals supplied to the liquid crystal panel 1 in accordance with the control signals S2 (i.e., control signals based on information relating to the color temperature of the backlight 2 detected by the sensors 5, 6, and 7) from the CPU 10.

The levels of the display signals supplied to the liquid crystal panel 1 are expressed as Rp, Gp, and Bp.

With white points as the reference, there exist the relations of:

decrease in Rp→x of the xy coordinates decreases, y does not change;

decrease in Gp→x of the xy coordinates does not change, y decreases;

decrease in Bp→x of the xy coordinates increases, y increases.

For example, this yields:

$$\Delta x=0.0004\times\Delta Rp$$

$$\Delta y=0\times\Delta Rp.$$

The levels of Rp, Gp, and Bp are controlled according to how much deviation has occurred from the reference color temperature values x and y measured at a time of factory shipment. The method is shown below. Current color temperature values x and y are expressed as xc and yc, and reference color temperature values x and y are expressed as xf and yf.

(1) The case where yc is less than yf, and xc is greater than xf: yc and yf are matched by decreasing Bp.

The amount of change in x and y relative to change in Bp is as follows.

$$\Delta y=-0.0002\times\Delta Bp$$

$$\Delta x=-0.0002\times\Delta Bp$$

$$\Delta Y=0.0764\times Y(255,255,255)\times\Delta Bp/255$$

Furthermore, xc and xf are matched by decreasing Rp.

The amount of change in x and y relative to change in Rp is as follows.

$$\Delta y=0$$

$$\Delta x=0.0004\times\Delta Rp$$

$$\Delta Y=0.338\times Y(255,255,255)\times\Delta Rp/255$$

Figure 5:
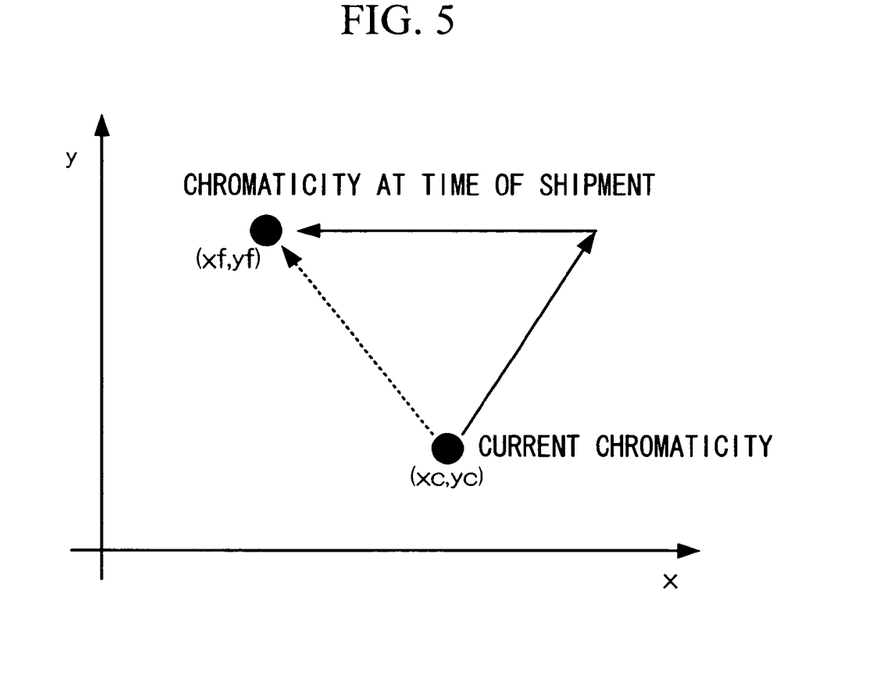
FIG. 5 is a schematic view for the case where yc and yf are matched by reducing Bp, when yc is less than yf.

FIG. 5 is a schematic view for the cases where yc and yf are matched by decreasing Bp when yc is less than yf, and where xc and xf are matched by decreasing Rp when xc is greater than xf.

(2) The case where yc is less than yf, and xc is less than xf: yc and yf are matched by decreasing Bp.

The amount of change in x and y relative to change in Bp is as follows.

$$\Delta y = -0.0002 \times \Delta Bp$$

$$\Delta x = -0.0002 \times \Delta Bp$$

$$\Delta Y = 0.6691 \times Y(255,255,255) \times \Delta Bp/255$$

Furthermore, xc and xf are matched by decreasing Bp and Gp.

The amount of change in x and y relative to change in Bp and Gp is as follows.

$$\Delta x = -0.0003 \times \Delta BpGp$$

$$\Delta y = 0.00008 \times \Delta BpGp$$

$$\Delta Y = 0.7309 \times Y(255,255,255) \times \Delta BpGp/255$$

Figure 6:
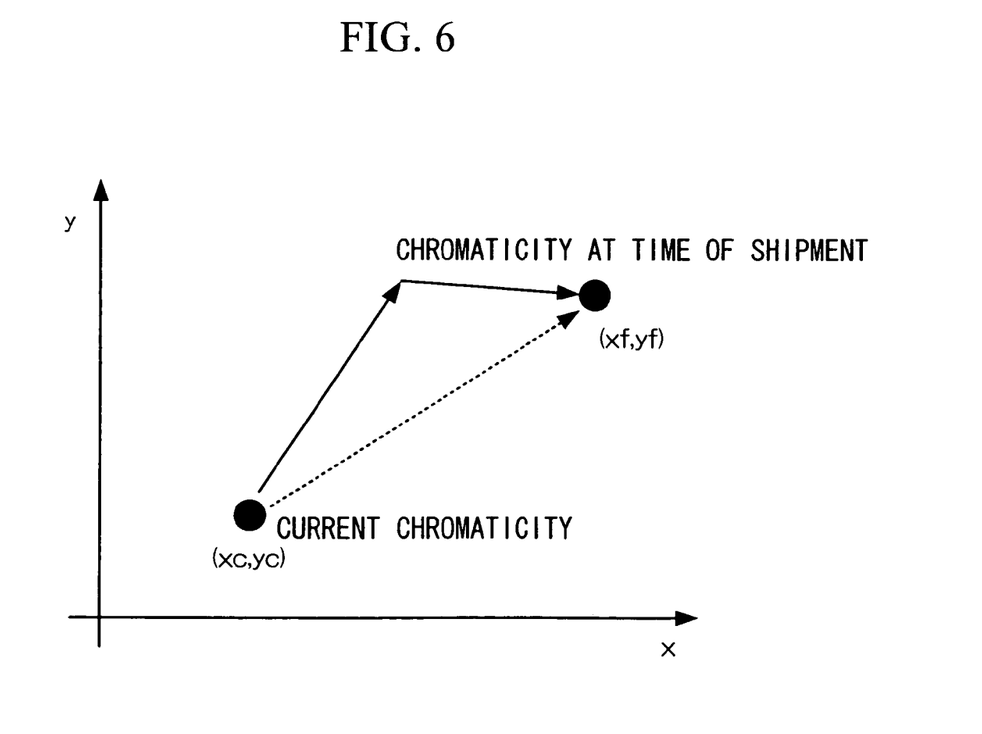
FIG. 6 is a schematic view for the case where yc and yf are matched by reducing Bp, when yc is less than yf.

FIG. 6 is a schematic view for the cases where yc and yf are matched by decreasing Bp when yc is less than yf, and where xc and xf are matched by decreasing Bp and Gp when xc is less than xf.

(3) The case where yc is greater than yf, and xc is greater than xf: yc and yf are matched by decreasing Gp The amount of change in x and y relative to change in Gp is as follows.

$$\Delta x = -0.00009 \times \Delta Gp$$

$$\Delta y = 0.0003 \times \Delta Gp$$

$$\Delta Y = 0.6691 \times Y(255,255,255) \times \Delta Gp/255$$

Furthermore, xc and xf are matched by decreasing Rp.

The amount of change in x and y relative to change in Rp is as follows.

$$\Delta y = 0$$

$$\Delta x = 0.0004 \times \Delta Rp$$

$$\Delta Y = 0.338 \times Y(255,255,255) \times \Delta Rp/255$$

Figure 7:
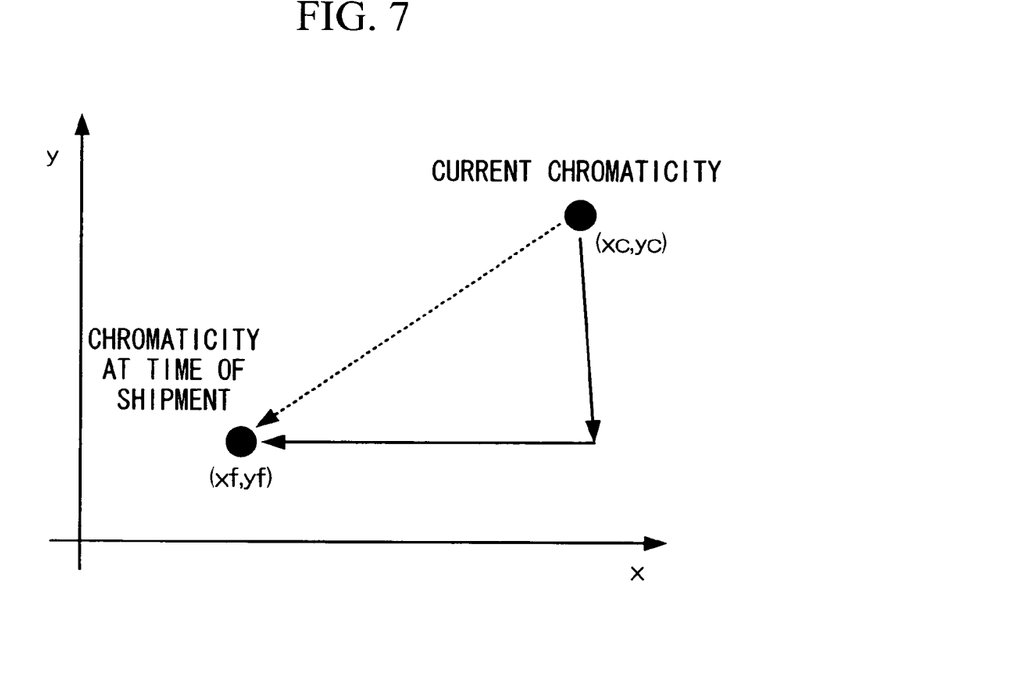
FIG. 7 is a schematic view for the case where yc and yf are matched by reducing Gp, when yc is greater than yf.

FIG. 7 is a schematic view for the cases where yc and yf are matched by decreasing Gp when yc is greater than yf, and where xc and xf are matched by decreasing Rp when xc is greater than xf.

(4) The case where yc is greater than yf, and xc is less than xf: yc and yf are matched by decreasing Gp The amount of change in x and y relative to change in Rp and Gp is as follows.

$$\Delta y = -0.00009 \times \Delta RpGp$$

$$\Delta x = 0.0003 \times \Delta RpGp$$

$$\Delta Y = 0.6691 \times Y(255,255,255) \times \Delta RpGp/255$$

Furthermore, Bp and Gp are decreased.

The amount of change in x and y relative to change in Bp and Gp is as follows.

$$\Delta x = -0.0003 \times \Delta BpGp$$

$$\Delta y = 0.00008 \times \Delta BpGp$$

$$\Delta Y = 0.7309 \times Y(255,255,255) \times \Delta BpGp/255$$

Figure 8:
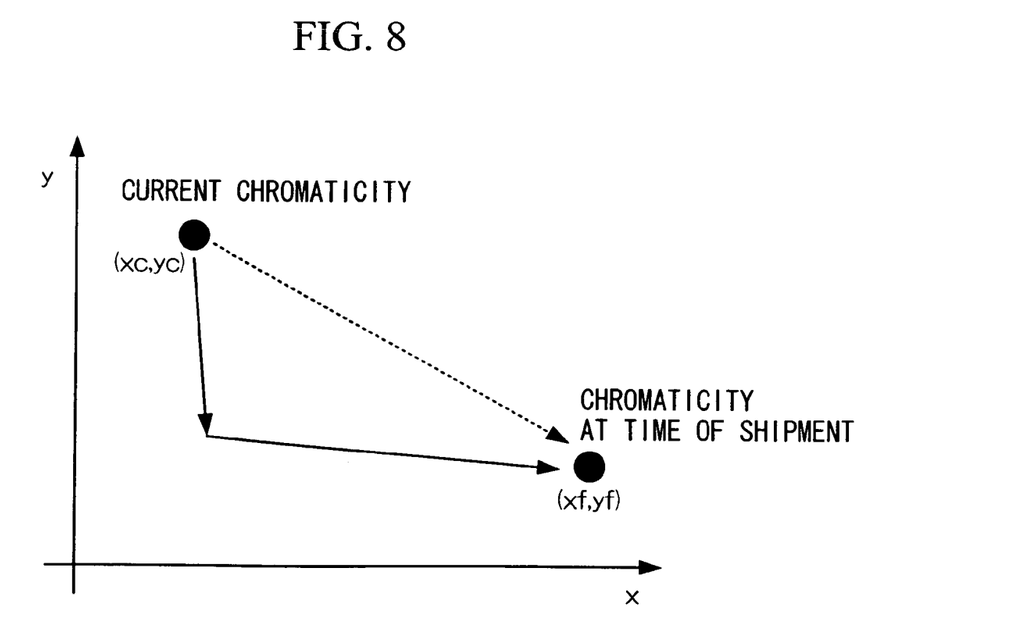
FIG. 8 is a schematic view for the case where yc and yf are matched by reducing Gp, when yc is greater than yf.

FIG. 8 is a schematic view for the cases where yc and yf are matched by decreasing Gp when yc is greater than yf, and where xc and xfp are matched by decreasing Bp and Gp when xc is less than xf.

In the foregoing (1)-(4), when the entirety of RGB is less than 255, a change is made so that the highest color is 255.

The levels of the display signals supplied to the liquid crystal panel 1 ordinarily adopt a maximum value of 255 when resolution is 8 bits. As stated above, when chromaticity is adjusted by changing display signal levels, luminance Lv decreases. Luminance variation at the time of change in the respective display signal levels of RGB are therefore measured in advance to calculate how much luminance falls when chromaticity is adjusted. An example thereof is expressed by $\Delta Y$ in the above (1)-(4). Luminance is fixed by adding the $\Delta Y$ to an expected value Lv'.

It is possible to conceive of a variety of applications with respect to a method which fixes the luminance value Lv by adding the reduction in luminance produced by changing the RGB levels of the display signals supplied to the liquid crystal panel 1 to the expected value Lv'.

As one example, there is a method which changes the RGB levels to change the screen color temperature of the liquid crystal panel 1. For example, in the case of a liquid crystal panel in which the maximum levels of all RGB (in the case of 8 bits, R=255, G=255, and B=255) is 6500 K (kelvin), for a setting of 9300 K, it would have R=180, G=197 and B=255, and luminance would decrease to 33%. By adding this decreased portion to the expected value Lv', it is possible to change color temperature without changing luminance.

As another example, as a method for improving luminance uniformity and color uniformity of a liquid crystal panel, there is a method which changes RGB levels according to portions of the screen. Liquid crystal panels are generally made so that luminance is higher in the central part where the human eye focuses to give the screen a bright appearance. In order to satisfy standards for luminance/color uniformity for medical uses and so on, there is a method which reduces peripheral luminance differences to improve luminance/color uniformity by reducing RGB levels at the center of the screen. Since it is common to conduct measurement at the central part of the screen with respect to definition of the luminance of a screen, a reduction in luminance occurs when luminance/color uniformity is improved. By adding this decreased portion to the expected value Lv', it is possible to improve luminance/color uniformity without changing luminance.

Figure 9A:
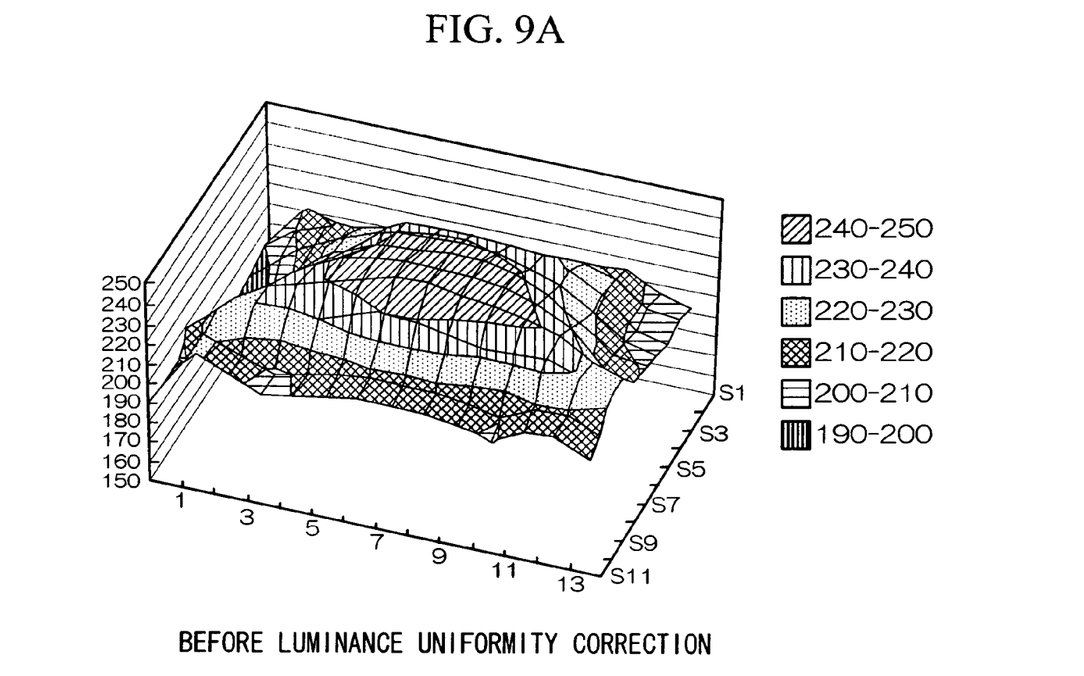
FIG. 9A is a schematic view which shows luminance properties before luminance uniformity correction.
Figure 9B:
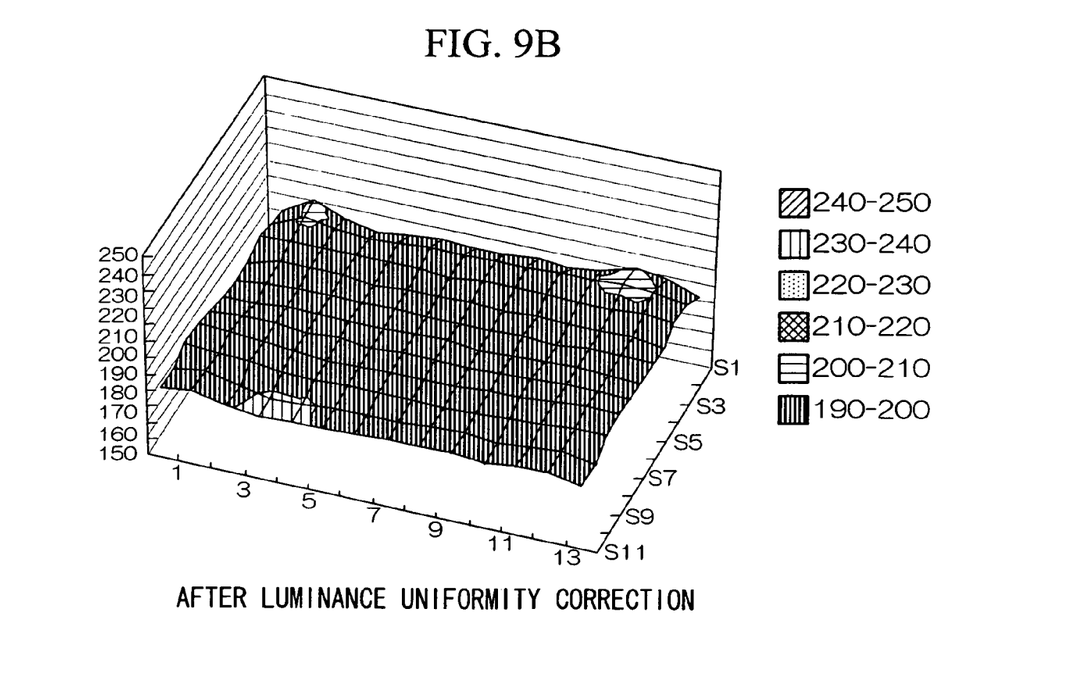
FIG. 9B is a schematic view which shows luminance properties after luminance uniformity correction.

Here, FIG. 9A is a schematic view which shows luminance properties before the luminance uniformity correction of the present embodiment, and FIG. 9B is a schematic view which shows luminance properties after conducting the luminance uniformity correction of the present embodiment. Prior to luminance uniformity correction, as shown in FIG. 9A, it is clear that luminance is highest at the central part, and lower toward the periphery. In contrast, after luminance uniformity correction, as shown in FIG. 9B, it is clear that luminance is approximately uniform.

According to the foregoing embodiment, in the liquid crystal display apparatus, the optical output of the backlight 2 is detected by the respective sensors 5, 6, and 7 of RGB, the luminance value Lv and color temperature x and y are obtained from these values, and the display signal levels to the liquid crystal panel 1 is controlled so that the expected value Lv' of luminance and the color differences x and y at the time of factory shipment are attained, and thereby it is possible to achieve a constant and stable luminance and chromaticity.

INDUSTRIAL APPLICABILITY

The present invention can be applied to a liquid crystal display apparatus having a backlight. According to the liquid crystal display apparatus and the liquid crystal display apparatus control method of the present invention, it is possible to achieve constant and stable luminance and chromaticity.

The invention claimed is:

1. A liquid crystal display apparatus comprising:
a liquid crystal panel;
a backlight provided on a rear face of the liquid crystal panel;
a detector which detects RGB output light levels of the backlight;
a first controller which controls backlight current for driving the backlight so that a prescribed luminance is attained based on the RGB output light levels detected by the detector;
a second controller which controls display signals supplied to the liquid crystal panel so that a prescribed chromaticity is attained based on the RGB output light levels detected by the detector;
a first converter which converts the RGB output light levels detected by the detector into tristimulus values;
a second converter which converts the tristimulus values into a luminance value and chromaticity values,
wherein the first controller controls the backlight current for driving the backlight based on the luminance value converted by the second converter, and the second controller controls the display signals supplied to the liquid crystal panel based on the chromaticity values converted by the second converter, and
wherein the first controller controls the backlight current so that the luminance value converted by the second converter matches a prescribed expected value; and
a corrector which corrects the prescribed expected value when the first controller controls the backlight current for driving the backlight, in order to prevent luminance variation in the liquid crystal panel produced when the second controller controls the display signals supplied to the liquid crystal panel.

2. The liquid crystal display apparatus according to claim 1, wherein the second controller controls the display signals supplied to the liquid crystal panel so that the chromaticity values converted by the second converter match prescribed expected values or initial values.

3. A liquid crystal display control method for a liquid crystal display apparatus including a liquid crystal panel and a backlight provided on a rear face of the liquid crystal panel, the method comprising:
detecting RGB output light levels of the backlight;
controlling backlight current for driving the backlight so that a prescribed luminance is attained based on the detected RGB output light levels;
controlling display signals supplied to the liquid crystal panel so that a prescribed chromaticity is attained based on the detected RGB output light levels;
converting the detected RGB output light levels into tristimulus values;
converting the tristimulus values into a luminance value and chromaticity values,
wherein, in the controlling of the backlight current, the backlight current for driving the backlight is controlled based on the converted luminance value,
in the controlling of the display signals, the display signals supplied to the liquid crystal panel are controlled based on the converted chromaticity values, and
in the controlling of the backlight current, the backlight current is controlled so that the converted luminance value matches a prescribed expected value, the method further comprising:
correcting the prescribed expected value when the backlight current for driving the backlight is controlled in the controlling of the backlight current, in order to prevent luminance variation in the liquid crystal panel produced when the display signals supplied to the liquid crystal panel are controlled in the controlling of the display signals.

* * * * *